July 5, 1938.  A. S. BARKLEY  2,122,709
AEROFOIL STRUCTURE
Filed Jan. 14, 1937  5 Sheets-Sheet 1

Inventor
ARCHIEBALD S. BARKLEY

Attorney

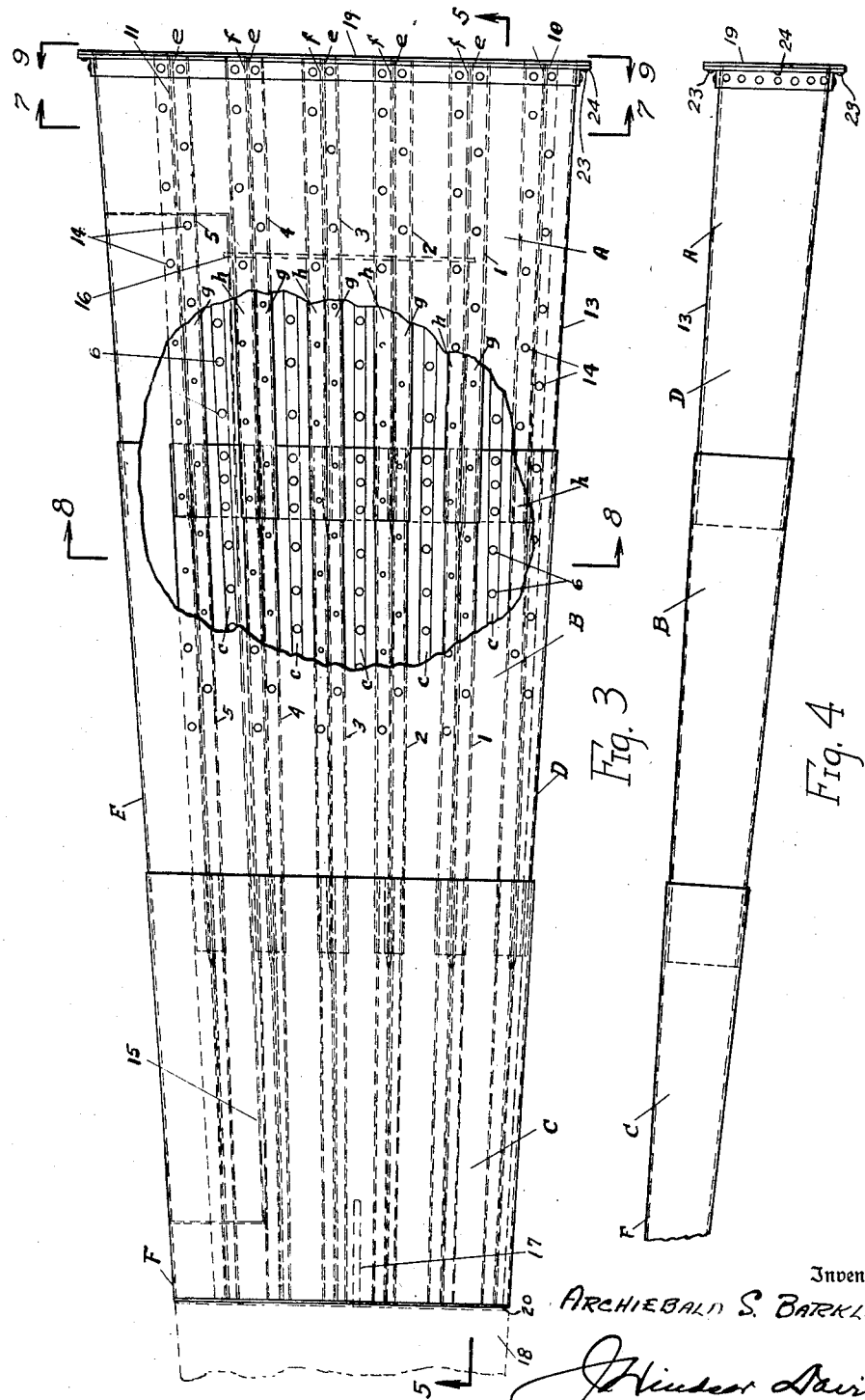

July 5, 1938.  A. S. BARKLEY  2,122,709
AEROFOIL STRUCTURE
Filed Jan. 14, 1937   5 Sheets-Sheet 3
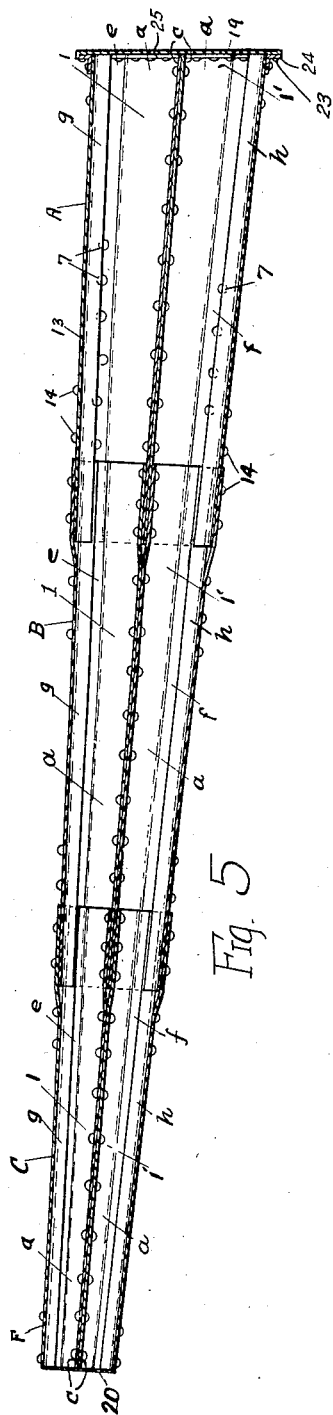
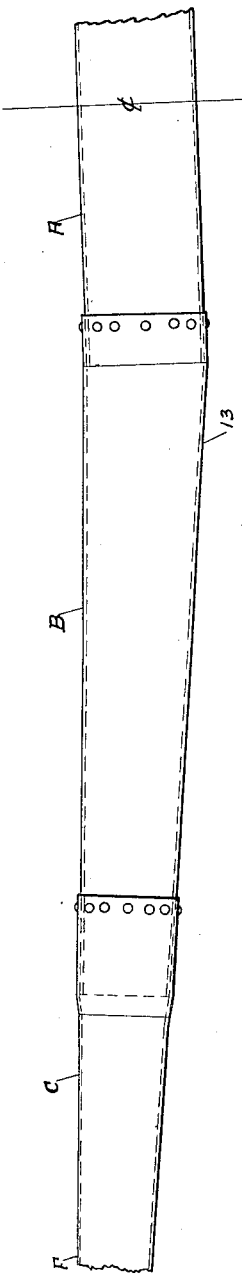
Inventor
ARCHIEBALD S. BARKLEY
Attorney July 5, 1938.    A. S. BARKLEY    2,122,709
AEROFOIL STRUCTURE
Filed Jan. 14, 1937    5 Sheets-Sheet 4

Inventor
ARCHIEBALD S. BARKLEY

Attorney

July 5, 1938. A. S. BARKLEY 2,122,709
AEROFOIL STRUCTURE
Filed Jan. 14, 1937 5 Sheets-Sheet 5
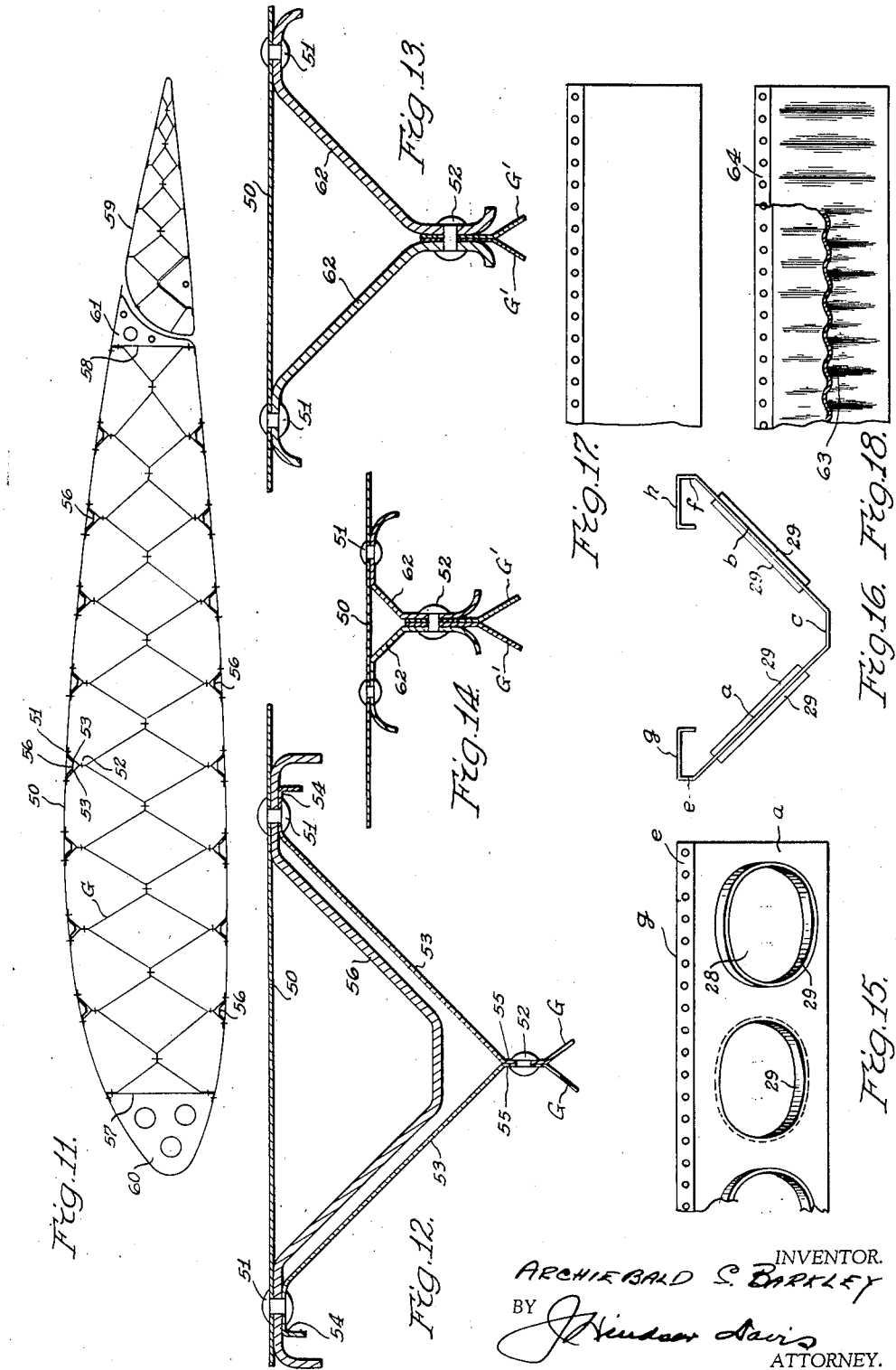

Patented July 5, 1938

2,122,709

UNITED STATES PATENT OFFICE 2,122,709

AEROFOIL STRUCTURE

Archiebald S. Barkley, Detroit, Mich., assignor to Barkley-Grow Aircraft Corporation, Detroit, Mich., a corporation of Michigan Application January 14, 1937, Serial No. 120,476

8 Claims. (Cl. 244—123)

This invention relates to airplane wing and control surfaces and has for its object to provide improved all-metal wings and control surfaces.

More specifically, it is an object of the present invention to provide all-metal wings and control surfaces lighter than but equal in strength and size to those made in previously known ways.

Another object of this invention is to provide wings and control surfaces in which the stresses, instead of being concentrated in a few spars and connections, are widely distributed, so that any small portion of a wing or control surface can be injured, as by gunfire, without seriously impairing the strength of the wing or control surface as a whole.

Another object of this invention is to provide all-metal wings and control surfaces adapted to be economically produced in quantity.

It has been found, in all-metal wings, that structures of the same strength can be made lighter in weight if parts of those structures carry more than one type of load, and the tendency in design has been to design parts of the structures so that they can carry a plurality of different loads. For instance, in many all metal wings, the skin is smooth and carries part or all of the drag loads. In some few wings, the upper and lower skins, together with vertical webs joining them, also carry bending loads, and these wings represent the most advanced practical design prior to the construction and use of wings embodying my invention. However, in those wings it is necessary to provide local skin stiffeners spaced from and between the spars or webs and to provide rib-like diaphragms, bulkheads, or other means perpendicular to the spars to interconnect them and preserve the shape of the wing section.

In a wing or control surface constructed according to my invention the skin stiffeners spaced from the webs connecting the skins together and the diaphragms or other means extending between and separate from the spars or webs can be reduced in number or entirely omitted. The elimination of these portions of the structure formerly necessary is made possible by the use of a novel form of web structure which supports the skins along enough lines to make many or all longitudinal intermediate stiffeners unnecessary and which, when combined with the skins, acts as a truss extending chordwise of the wing and reduces or eliminates the need for other chordwise stiffening means. When full advantage is taken of my method of constructing a wing, no intermediate longitudinal stiffeners nor chordwise bulkheads or ribs are necessary and the total weight of the wing is substantially less than that of the best previous all-metal wings of equal size and strength.

How the above mentioned and other objects and results are attained will appear from the following description and appended claims, reference being had to the accompanying drawings forming part of this specification, wherein like reference characters designate corresponding parts in the several views.

Figure 3 is an enlarged plan view of one of the wings shown in Figure 1, a part of the wing being broken away to show the interior construction.

Figure 4 is a front view of the wing shown in Figure 3.

Figure 5 is a sectional view on line 5—5 of Figure 3, taken in the direction of the arrows.

Figure 6 is a front view of a second form of the invention.

Figure 11 is a sectional view of a fourth form of the invention.

Figure 12 is an enlarged detail view of the form of the invention shown in Figure 11.

Figures 13 and 14 are enlarged detail views of a fifth form of the invention similar to the form shown in Figures 11 and 12.

Figure 15 is a side view of one form of web member.

Figure 16 is an end view of the web member shown in Figure 15.

Figures 17 and 18 are side views of other forms of web members.

One of the preferred forms of my invention, shown in Figures 1 to 5 and 7 to 9 comprises a wing, each half of which is formed of three sections A, B and C. The three sections A, B and C are each formed of longitudinally extending sheets of metal riveted together, although they may be welded. The sheets forming each section overlap and are riveted or otherwise fastened to the sheets of the adjacent section, so that the sheets of the several sections form a single unitary structure.

Figure 7:
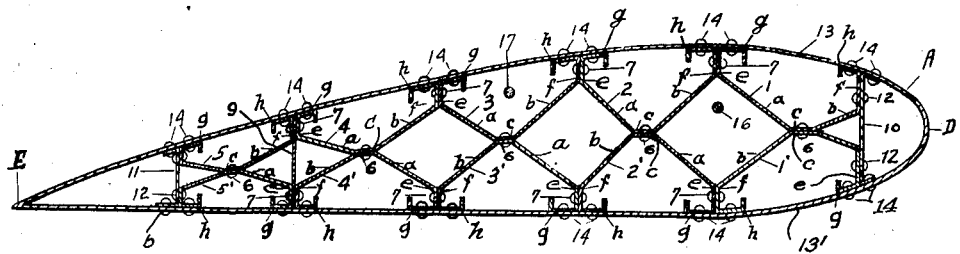
Figure 7 is a sectional view on the line 7—7 of Figure 3, taken in the direction of the arrows.

At the root of the wing, as shown in Figure 7, the upper and lower skins 13 and 13' are connected by a plurality of web members 1 to 5 and 1' to 5'. These web members lie between front and rear vertical web members 10 and 11 near the leading and trailing edges D and E of the wing. They are riveted to each other and to the skin to form a rigid structure. Each of the web members 1 to 5 and 1' to 5' has the general shape of a V-section trough with two wide sloping portions $a$ and $b$ forming the sloping sides of the V-section. The sides $a$ and $b$ are joined together by a narrow horizontal portion $c$ which is secured by rivets 6 to a similar flat portion of another web member, the two web members together forming an X-section. The edges of each of the web members 1 to 5 and 1' to 5' are bent to form narrow vertical portions $e$ and $f$, narrow substantially horizontal portions $g$ and $h$, and small vertical stiffening flanges $i$ and $j$.

The X-sections formed by the pairs of web members 1 and 1', 2 and 2', 3 and 3', 4 and 4', and 5 and 5' extend side by side with their narrow vertical portions $e$ and $f$ in contact and secured together by rivets 7. The narrow approximately horizontal portions $g$ and $h$ of the web members 1 to 5 and 1' to 5' lie against the inner sides of and are secured by rivets 14 to the upper and lower skins 13 and 13' respectively. The narrow vertical portions $e$ and $f$ nearest the leading and trailing edges D and E of the wing are secured to the web members 10 and 11 by rivets 12.

Figure 8:
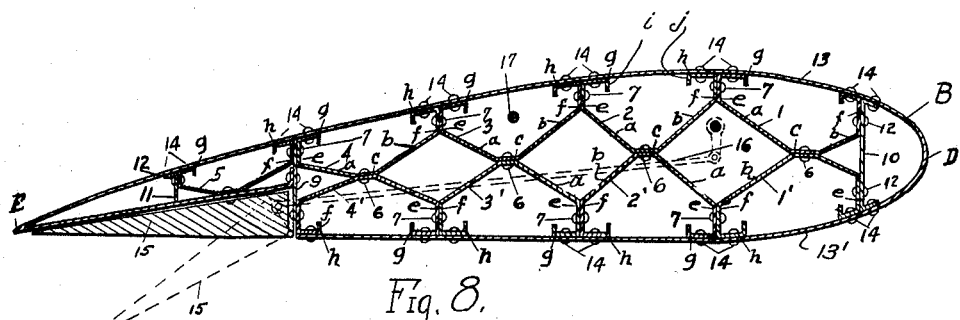
Figure 8 is a sectional view on the line 8—8 of Figure 3, taken in the direction of the arrows.
Figure 9:
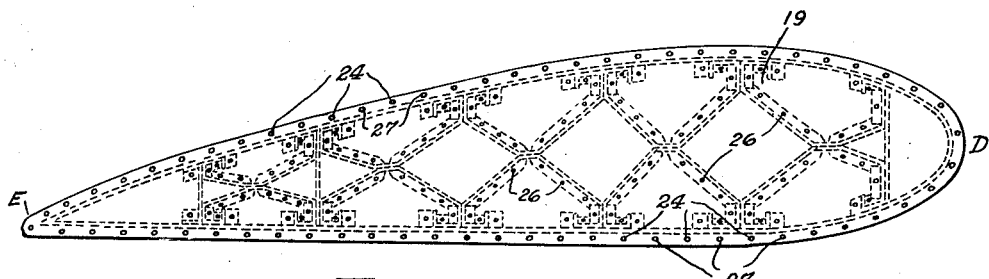
Figure 9 is an end view on the line 9—9 of Figure 3 taken in the direction of the arrows.

A web member 9 is secured between the portions $e$ and $f$ of the web members 4, 4', 5 and 5' a little ahead of the trailing edge E of the wing. The web member 9 extends along the wing just ahead of the flap 15 or, in wings having conventional ailerons, just ahead of the aileron and forms part of the means to which the flap or aileron is hinged, as shown in Figure 8.

The root sections A of the two halves of the wing are closed at their inner ends with vertical flat plates 19 secured to the skin 13 of the wing by means of an angle member 23 and flush rivets 24. The ends of the web members 1 to 5 and 1' to 5' in each half of the wing have flanges 25 secured to the plates 19 by flush rivets 26. The wing sections A are bolted either to each other or to a center wing section lying between them, depending upon the design of the airplane. In the particular embodiment shown, the two sections are bolted directly to each other without an intermediate center section, but a conventional center section may be provided. In any case the connection is formed by bolts extending through holes 27 in the angle members 23 and end plates 19, or, if the end plates 19 are omitted, through the angle members 23 only.

The web members 1 to 5 and 1' to 5' are preferably formed with flanged apertures 28 in their wide sloping portions $a$ and $b$, as shown in Figs. 15 and 16. The flanges 29 around the apertures project alternately in opposite directions as this has been found to result in greater strength than if the flanges all project in the same direction. The apertures 28 serve to lessen the weight of the structure and facilitate assembly. They also permit the passage across the wing of control and other members, such as the rod 16 for actuating the flap 15.

Passage along the wings, as for the shafts 17 for the ailerons 18, is provided by the longitudinally extending spaces between one web member and the next and between the web members and the skin. The aileron shafts 17 are supported by suitable bearings (not shown) carried by the web members and by plates 20 secured to the outer ends F of the end sections C.

The fuselage 21 may be secured to the wings in any conventional manner, as by being built onto a center wing section of conventional structure where such a section is used. In the embodiment shown, which is without a separate center wing section, the fuselage is secured directly to the upper skin 13 of the wing by angles 22. If desired, the web members 1 to 5 and 1' to 5' may be provided with stiffeners (not shown) directly under the load applying members 22, the stiffeners extending across the web members and serving to distribute the load across them.

It will be noted from a study of Figure 7 that, although there are vertical web members 9 and 10 near the leading and trailing edges D and E, there are no vertical web members in the thickest part of the wing section. In that part of the wing section, the only direct connections between the upper and lower skins 13 and 13' are through the wide sloping portions $a$ and $b$ of the various trough-shaped web members 1, 1', 2, 2', 3 and 3'.

It is important that in the thickest part of the wing section, which is the part which carries the greatest stresses, most of the distances from one skin to the other measured along all the possible direct paths lying on the faces of the web members be approximately the same. It is especially important that none of such distances be substantially less than the majority of such distances. These points are important because the average shear stress in the metal on said paths, which can be termed "shear paths", is approximately inversely proportional to the lengths of the paths. Therefore, when a wing having the distances along some of such shear paths substantially shorter than the distances along the majority of the shear paths is subjected to maximum load and the metal along the majority of the shear paths is subjected to approximately the maximum safe shear stress, the metal along the shorter paths will be subjected to a shear stress greater than the maximum safe shear stress and will fail. Also, if a wing were built with some of the shear paths described above much longer than the majority of such shear paths, the metal along the longer paths would be stressed far below the maximum safe shear stress and would not be efficiently used, thus adding weight.

Besides forming an efficient means for transmitting shear forces, as explained above, the web structure cooperates with the skin to form a truss structure extending between the leading and trailing edges D and E. The web structure therefore maintains the cross sectional shape of the wing and makes ribs or transverse bulkheads unnecessary.

Figure 1:
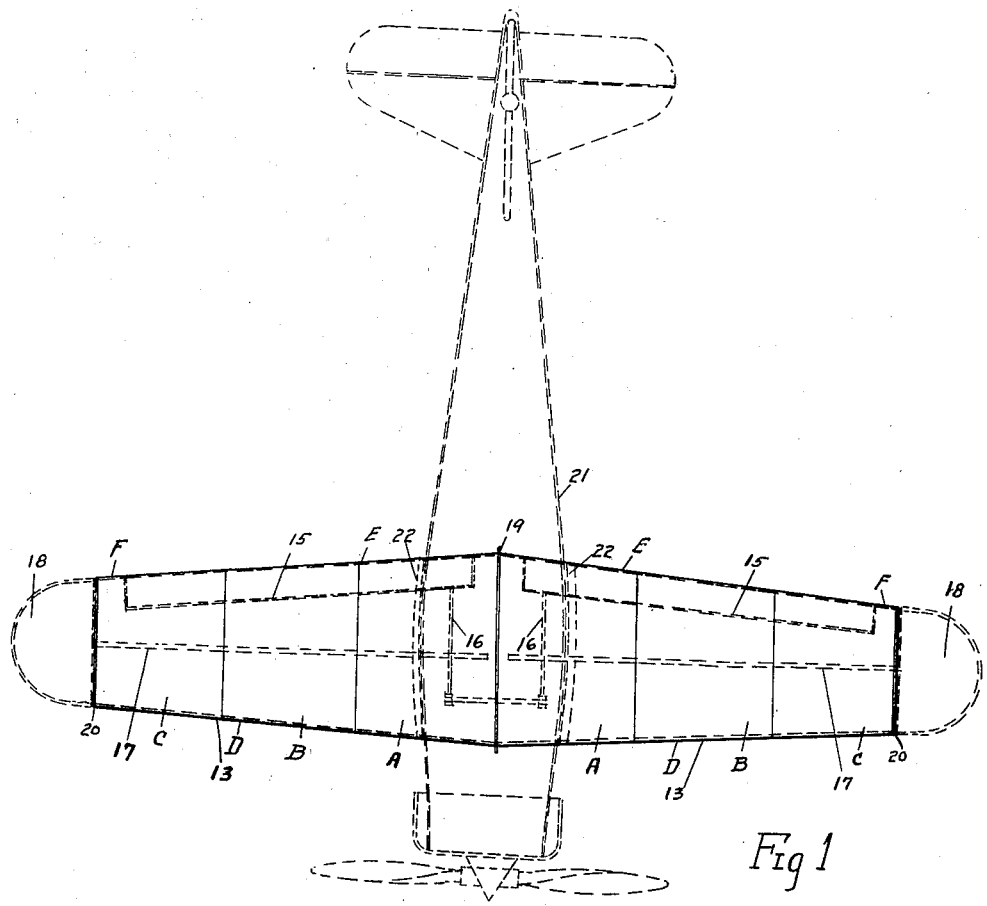
Figure 1 is a plan view of one embodiment of my invention, showing a wing having flaps and showing, in dotted lines, a fuselage, ailerons and other details not forming a part of the wing itself.
Figure 2:
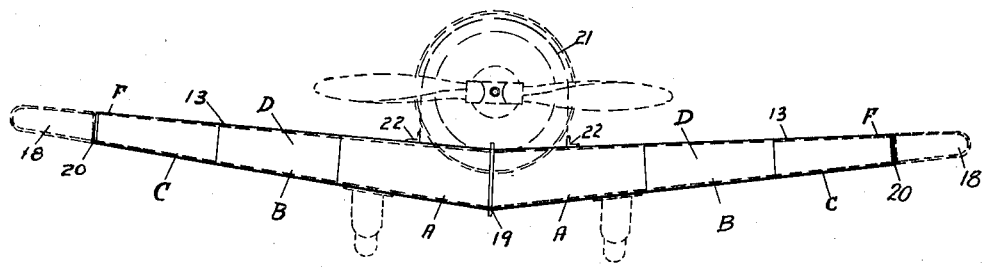
Figure 2 is a front view of the embodiment shown in Figure 1.

Instead of making the wing in two sections, as shown in Fig. 1, or in three or more sections, as is convenient for large airplanes, the entire wing can be made a single continuous structure, as shown in Fig. 6. This type of construction is especially suitable for the wings of small airplanes or for other aerofoils of similar size, such as the stabilizers of large airplanes.

Figure 10:
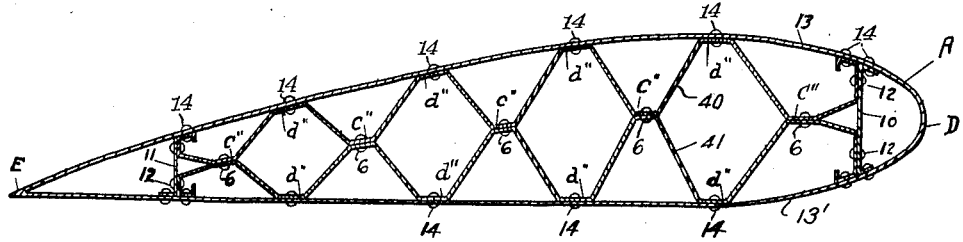
Figure 10 is a sectional view similar to Figure 7 but showing a third form of the invention.

Another modification is shown in Fig. 10. In this form the web structure at any section of the wing is formed chiefly from two large sheets of metal 40 and 41 each formed into a series of deep angular corrugations with flat narrow crests $c''$ and $d''$. The two sheets 40 and 41 are placed with their crests $c''$ in contact with each other, and are secured together by rivets 6 to form a series of contiguous tubes having diamond shaped cross-sections. The edges of the sheets 40 and 41 are secured to flat web members 10 and 11 by rivets 12. The web assembly is enclosed by the skin 13 and 13' and the skin is secured by rivets 14 to the crests $d''$ of the corrugated web members 40 and 41 and to the flanged edges of the flat and corrugated web members 10, 11, 40 and 41. The structure thus formed is generally similar to the one illustrated in Fig. 7 and functions in substantially the same way.

The form of the invention shown in Figs. 11 and 12 is particularly suitable for large wings. This form is generally similar to the form shown in cross-section in Fig. 8. However, the edges of the trough-like web members G, instead of being flanged and riveted to the skin 50 closely adjacent the points where they are riveted to each other, extend out and away from each other and are secured to the skin by rivets 51 along lines spaced from each other and from the lines of rivets 52 securing adjacent web members G together. Thus each web member G is a trough with its opposite edge portions 53 bent back towards each other. The free margin 54 of each edge portion is secured by rivets 51 to the skin 50 and the regions 55 from which the edge portions 53 are bent back are secured by rivets 52 to the similar regions 53 of the next web members. The row of rivets 51 securing one edge 54 of one web member G to the skin 50 is at a substantial distance from the row of rivets 51 securing the adjacent edge 54 of the next web member G to the skin 50. Also, the two rows of rivets 51 securing the two edges of one web member G to the skin 50 are substantially closer than in the type of construction shown in Figure 7. This gives a more even spacing of the rows of rivets 51, and the skin 50 is therefore better supported against buckling and can carry greater loads.

To further increase the strength of the wing in bending, longitudinally extending flange members 56 are placed between the skin 50 and the portions 54 of the web members G secured thereto. The flange members 56 as shown on an enlarged scale in Fig. 12, are wide enough to extend from one row of rivets 51 to the next and are of such a cross section that they will strongly resist buckling.

In the form of the invention illustrated by Fig. 11, the diagonal web structure extends between vertical web members 57 and 58 near the leading edge and just ahead of the aileron or flap 59. The portions of the wing ahead of and behind the vertical web members 57 and 58 are formed by bending the skin around and securing it to short flanged and pierced rib members 60 and 61 secured to the vertical web members 57 and 58. The aileron or flap 59, which may be of conventional structure, is in this case made similar to the wing shown in cross-section in Fig. 7.

A modification of a part of the wing shown in Figures 11 and 12 is shown in Figures 13 and 14, corresponding portions of the two forms of wing being shown in Figures 12 and 13. In the modification, the web members G' do not extend out to the skin 50 but are terminated just beyond the row of rivets 52. The rivets 52 serve to secure together the edges of two adjacent web members G' and the edges of two comparatively thick flange members 62. The other edges of the flange members 62 are spaced apart and are secured by rivets 51 to the skin 50. The flange members 62 thus perform the functions of both the flange member 56 and the portions 53 of the web members shown in Fig. 12. The structure shown in Fig. 13 is near the center of the wing where the bending load is greatest. As the tips of the wings are approached the flange members 62 become narrower and lighter as shown in Fig. 14.

The web members of any of the various forms of the invention may be formed in several ways. As shown in Figs. 15 and 16 in connection with the form of the invention shown in Figs. 1 to 5 and 7 to 9, the web members may be provided with large flanged openings. The web members may be flat and unperforated as shown in Fig. 17, or their wide portions may be corrugated as shown in Fig. 18. In the latter modification, the corrugations 63 extend across the web member and perpendicular to the longitudinally extending uncorrugated regions 64 which are riveted to other members.

What I claim is:—

1. An aerofoil structure comprising an upper stressed skin, a lower stressed skin, a spar near the leading edge of the wing, a second spar near the trailing edge of the wing, said spars being spaced chordwise of the wing a substantial distance from the thickest portion thereof and their depth at any section of the wing being substantially less than the greatest thickness of the wing at that section, and a shear transmitting web structure lying between said spars and secured to said skins, said web structure consisting of intersecured longitudinally extending webs, said webs forming the walls of a series of adjacent four-cornered and four-sided tubular cells and cooperating with the skins to form a series of spaced three-sided and three cornered tubular cells along each skin, the upper corner of each of said four-sided cells being secured to the depending corner of one of the three sided cells formed in part by the upper skin, the lower corner of each of said four-sided cells being secured to the upstanding corner of one of the three sided cells formed in part by the lower skin, and the lateral corners of each of the four-sided cells being secured to the lateral corners of adjacent cells.

2. An aerofoil structure as described in claim 1 in which said web structure consists entirely of said intersecured webs.

3. An aerofoil structure as described in claim 1 in which the lateral walls of said three-sided cells are of stronger material than the walls of said four-sided cells.

4. An aerofoil structure as described in claim 1 together with longitudinally extending reenforcing members and common means by which the lateral walls of the three-sided cells are secured to the skins.

5. An aerofoil structure as described in claim 1 in which the lateral walls of the three-sided cells are secured to the skins by rivets together with longitudinally extending reenforcing means also secured to said skins and said lateral walls by said rivets.

6. An aerofoil structure as described in claim 1 in which longitudinally extending reenforcing members lie at least partly within said three-cornered cells, each of said reenforcing members being secured to said skin along two corners of the cell containing it.

7. An aerofoil structure as described in claim 1 in which longitudinally extending reenforcing members lie at least partly within said three cornered cells, each of said reenforcing members being secured to said skin along two corners of the cell containing it by means also securing the walls of said cell to said skin.

8. An aerofoil structure as described in claim 1 in which laterally bent longitudinally extending reenforcing members lie at least partly within said three-cornered cells, each of said reenforcing members being secured to said skin along two corners of the cell containing it.

ARCHIEBALD S. BARKLEY.